United States Patent

Matsuoka et al.

[15] 3,697,647

[45] Oct. 10, 1972

[54] FEED CONTAINING ENDURACIDIN

[72] Inventors: Toshiro Matsuoka, Suita; Keinosuke Takeda; Minoru Goto, both of Kyoto; Akira Miayake, Nishinomiya, all of Japan

[73] Assignee: Takeda Chemical Industries, Ltd., Higashi-ku, Osaka, Japan

[22] Filed: Jan. 25, 1968

[21] Appl. No.: 700,385

[30] Foreign Application Priority Data

Jan. 25, 1967 Japan .........................42/4408

[52] U.S. Cl..................................................424/18
[51] Int. Cl. .............................................A61k 21/00

[58] Field of Search .........................424/118; 195/80

[56] References Cited

OTHER PUBLICATIONS

Derwent Farmdoc No. 26732, South African Patent 66– 6073, published March 15, 1967, pages 283– 305.

Primary Examiner—Jerome D. Goldberg
Attorney—Wenderoth, Lind & Ponack

[57] ABSTRACT

Enduracidin is a valuable additive for feedstuff and/or drinking water for livestock. It excels, for instance, aureomycin as such additive in its action as growth enhancing agent.

9 Claims, No Drawings

FEED CONTAINING ENDURACIDIN

This invention relates to a method for accelerating gain of body weight of livestock, and also to a feed composition or an additive thereto for accelerating gain of body weight of livestock.

It has been found in recent years that an antibiotic such as aureomycin, when fed to livestock, has the effect of accelerating gain of body weight of the livestock.

Although aureomycin has been known as useful for accelerating gain of body weight of livestock, it is still a desideratum in the art to make available new materials that can produce greater weight gain more rapidly than has hitherto been possible and which would attain the purpose in view more efficiently relative to feed intake, at a lower cost and without undesirable side effects.

The principal object of the present invention is to satisfy such desideratum and thereby to provide a method for accelerating greater gain of body weight of livestock.

Another object of the present invention is to provide a feedstuff composition, the feeding of which results in accelerating greater gain of body weight of livestock.

A further object is to provide an additive composition comprising Enduracidin, in the form of concentrate compounded with an edible carrier, which composition can be fed to the livestock, so as to make it convenient to be used for the practical purpose of realizing the above-recited objects of this invention.

The principal object of the invention is realized by feeding an effective amount of Enduracidin to the livestock, in association with feedstuff or drinking water.

Enduracidin, a metabolite of certain microorganisms, has a polypeptide structure. It is recovered e.g. from the culture broth of Enduracidin-producing microorganisms, e.g. *Streptomyces fungicidicus* No. B–5477, which are on deposit at American Type Culture Collection, Rockville, Md., under the accession numbers 21013 and 21014.

The term "Enduracidin" as used herein should be taken as meaning Enduracidin free base and/or its harmless, i.e. nutritionally acceptable, acid addition salt such as the hydrochloride thereof, unless otherwise noted.

Enduracidin per se is not part of the present invention, nor is the preparation thereof, this invention being directed to feed compositions comprising Enduracidin and to the use of such compositions as growth enhancers for livestock.

The aforementioned microorganism, *Streptomyces fungicidicus* No. B–5477, was isolated from the soil at Nishinomiya, Japan, by Motoo Shibata and co-workers.

The microbial characteristics of *Streptomyces fungicidicus* No. B-5477 (ATCC-21013) are as follows:

In the following characteristics, the color names designated as "Rdg." are based on Ridgway's Color Standard and Nomenclature.

A. Morphological Characteristics:
  Sporophores form spiral.
  Spores show an oval, $0.9\mu \times 1.6 - 1.1\mu$
  The surface of spores is spiny.
B. Cultural Characteristics:
  1. Czapek's agar:
    Vegetative mycelium (hereinafter abbreviated as VM):
    Abundant, spreading, penetrate into the medium, colorless.
    Aerial mycelium (hereinafter abbreviated as AM):
    Abundant, powdery, Quaker Drab (Rdg. LI, 1'''''').
    Reverse (hereinafter abbreviated as R):
    Warm Buff (Rdg. XV, 17'–d).
    Soluble pigment (hereinafter abbreviated as SP):
    None.
  2. Glucose Czapek's agar:
    VM: Abundant, spreading, colorless.
    AM: Abundant, powdery, Pale Quaker Drab (Rdg.XI, 1'''''–d).
    R: Warm Buff.
    SP: None or faint yellow.
  3. Glycerine Czapek's agar:
    VM: Abundant, folded, colorless.
    AM: Abundant, Deep Olive Gray (Rdg. LI, 23''''''), becoming
      Light Mouse Gray (Rdg. LI, 15'''''–b) to Light Quaker Drab (Rdg. LI, 1'''''–b).
    R: Warm Buff.
    SP: None or faint yellow.
  4. Glucose asparagine agar:
    VM: Abundant, spreading, colorless.
    AM: Abundant, Light Olive Gray (Rdg. LI 23''''''–d) to Pale Quaker Drab (Rdg. LI, 1'''''–d) or sometimes poor, white.
    R: Cream Color (Rdg. XVI, 19'–f) or colorless.
    SP: NOne.
  5. Bouillon broth:
    VM: Abundant, floating on the surface of the medium and a few colorless mycelia sink to the bottom.
    AM: Abundant, white.
    Transparent medium and no soluble pigment.
  6. Bouillon agar:
    VM: abundant, spreading, colorless.
    AM: Moderate, white to Pale Quaker Drab.
    R: Warm Buff (Rdg. XV, 17'–d).
    SP: None
  7. Glucose bouillon agar:
    VM: Abundant, folded, spreading, colorless.
    AM: Abundant, Deep Quaker Drab (Rdg. LI, 1''''–i).
    R: Yellow Ocher (Rdg.XV, 17').
    SP: Faint brown or none.
  8. Glycerine bouillon agar:
    VM: Abundant, spreading, colorless.
    AM: Abundant, powdery, Quaker Drab to Deep Quaker Drab.
    R: Isabella Color (Rdg. XXX, 19''–i).
    SP: None or faint brown.
  9. Starch agar:
    VM: Abundant, spreading, colorless.
    AM: Abundant, Light Quaker Drab (Rdg. LI, 1''''–b), becoming Quaker Drab.
    R: LIght Buff (Rdg. XV, 17'–f).
    SP: None.
  10. Egg:
    VM: Abundant, spreading, wrinkled.
    AM: Moderate, white to white with yellowish tinge and sometimes poor, white.
    The color of medium changes grayish white to brown.
  11. Yeast extract agar:

VM: Abundant, wrinkled, spreading, colorless.
AM: Abundant, powdery, Light Mouse Gray (RDG. LI, 15'''''-b) to Quaker Drab.
R: Isabella Color.
SP: None.
12. Potato plug:
VM: Abundant, spreading, raised up, colorless.
AM: Abundant, Quaker Drab.
The color of the medium changes dark brown after 3 weeks.
13. Milk:
VM: Abundant, folded, floating on the surface of the medium, colorless.
AM: Abundant, white to Pearl Gray (Rdg. LII, 35'''''-f).
Strong peptonization without coagulation.
14. Carrot plug:
VM: Abundant, spreading, raised up, colorless.
AM: Abundant, Quaker Drab (Rdg. LI, 1''''')
The color of plug changes to Buchthorn Brown (Rdg. XV, 17'-f).
15. Gelatin:
VM: Poor.
AM: Poor, white, slow liquefaction.
16. Nutrient gelatin:
VM: Abundant.
AM: Abundant, white, rapid liquefaction.
SP: NOne.
17. Nitrate reduction in Czapek's solution (containing NaNO₃ 0.1 percent): POsitive.
18. Cellulose:
2 VM: Abundant, spreading, colorless.
AM: Abundant, Quaker Drab (Rdg. LI, 1''''').
No decomposition.
19. Calcium malate agar:
VM: Abundant, spreading, thin, colorless.
AM: Moderate, Pallid Quaker Drab (Rdg. LI, 1''''-d) to Pallid Mouse Gray (Rdg. LI, 15'''''-f).
R: Naples Yellow (Rdg. XVI, 19'-d).
SP: None or faint yellow.
20. Tyrosine agar:
VM: Poor, thin, spreading, colorless.
AM: None.
R: Colorless.
SP: None.
21. Peptone agar:
VM: Abundant, spreading, flat, colorless.
AM: Poor, Drab Gray (Rdg. XLVI, 17'''''-b).
R: Faint Cream Color (Rdg. XVI, 19'-f).
SP: None
22. Starch casein agar:
VM: Abundant, spreading, flat, colorless.
AM: Abundant, velvety, Deep Mouse Gray (Rdg. LI, 15'''''-i).
R: Light Olive Gray (Rdg. LI, 23'''''-d).
SP: None.
23. Maltose tryptone agar:
VM: Abundant, spreading, flat, colorless.
AM: Abundant, Mouse Gray (Rdg. LI, 5''''') to Quaker Drab (Rdg. LI, 1''''').
R: LIght Buff (Rdg. XV, 17'-f).
SP: None or faint yellow.
24. Bennett's agar:
VM: Abundant, spreading, flat, thin, colorless.
AM: Abundant Quaker Drab to Deep Quaker Drab (Rdg. LI, 1'''''-i).
R: Colorless to Warm Buff (Rdg. XV, 17'-d).
SP: None.
25. Starch hydrolysis:
Hydrolysis, enzymatic zone/growth zone = $30^{mm}/10^{mm}$ to $28^{mm}/10^{m}$.

C. Utilization of Carbon Sources Observed by 1 Pridham Gottlieb Method:

| | | | |
|---|---|---|---|
| Erythritol | ± | Melibiose | ++ |
| Adonitol | ± | Maltose | +++ |
| D-Sorbitol | + | Sucrose | + |
| L-Inositol | +++ | Lactose | +++ |
| D-Mannitol | ++++ | Raffinose | + |
| Dulcitol | + | Trehalose | +++ |
| D-Xylose | +++ | Salicin | +++ |
| L-Arabinose | +++ | Aesculin | + |
| L-Sorbose | + | Inulin | ± |
| D-Galactose | +++ | Dextran | +++ |
| D-Glucose | ++ | Sodium acetate | ++ |
| D-Fructose | +++ | Sodium succinate | + |
| D-Mannose | ++ | Sodium citrate | + |
| Rhamnose | ++ | Control | ± |

Remarks: +++: Abundant growth, ++: Good growth, +: Fair growth, ±: Faint growth.

Comparison of the above-mentioned morphological and cultural characteristics with the description in "The Actinomyces, Volume II" 22 written by S. A. Waksman, published by The Williams and Wilkins Company in 1961, shows that the strain usable in the present invention is similar to morphological characteristics of *Streptomyces fungicidicus* in such points that sporophores form spiral, the surface of spores is spiny, aerial mycelium color is gray, no soluble pigment is produced, and that the strain is non-chromogenic type.

But there are differences in cultural characteristics of the strain from those of *Streptomyces fungicidicus*.

more specifically, *Streptomyces fungicidicus* produces pink soluble pigment when cultured on calcium malate agar and weakly coagulates and peptonizes milk on milk medium.

On the contrary, the present strain does not produce such soluble pigment or if it does produce soluble pigment, the latter is pale yellow, and it does not coagulate milk on milk medium but peptonizes the milk so strongly that the peptonization is completed within one week. Further, the present strain utilizes fructose and salicin, which are not utilized by *Streptomyces fungicidicus*.

Additionally, *Streptomyces fungicidicus* forms Fungicidine which is a fungicidal substance, while the present strain does not form such fungicidal substance in the culture broth nor in mycelia.

From the above-mentioned properties of the said strain, it is classified by Motoo Shibata and co-workers as a strain of *Streptomyces fungicidicus* and was designated by them as *Streptomyces fungicidicus* No. B-5477.

After screening out the strain with high potency, a mutant thereof was obtained by UV-irradiation, γ-ray irradiation and monospore culture. The mutant forms spiral sporophores and the surface of spores is spiny, the same as the original strain.

Cultural characteristics of the *Streptomyces fungicidicus* No. B-5477 mutant are shown hereinafter.

A specimen of *Streptomyces fungicidicus* No. B-5477 is on deposit at American Type Culture Collection, Rockville, Maryland, U.S.A., under the accession number ATCC-21013.

The antibacterial spectrum observed by the cross streak method of *Streptomyces fungicidicus* No. B-5477 on bouillon agar and glycerine bouillon agar is shown in Table 1. *Streptomyces fungicidicus* No. B–5477 was streaked on agar plates and incubated at 28° C for 4 days. The plates were then cross-streaked with test organisms shown in Table 1 and were further incubated at 37° C for 20 hours when Gram-positive bacteria and Gram-negative bacteria are used, and for 40 hours when acid-fast bacteria are used.

Finally, the inhibition length for each test organism was measured.

TABLE 1

Antibacterial spectrum of *Streptomyces fungicidicus* No. B-5477 by cross-streaked method.

|  | Bouillon agar | | Inhibitory zone (mm) Glycerine bouillon agar | |
| --- | --- | --- | --- | --- |
| *Escherichia coli* | 0 | 0 | 0 | 0 |
| *Proteus vulgaris* | 0 | 0 | 0 | 0 |
| *Staphylococcus aureus* | 0 | 0 | 12 | 12 |
| *Bacillus sbutilis* | 0 | 0 | 12 | 12 |
| *Bacillus cereus* | 0 | 0 | 0 | 0 |
| *Bacillus brevis* | 0 | 0 | 0 | 0 |
| *Saccharomyces lutea* | 0 | 0 | 0 | 0 |
| *micrococcus flavus* | 0 | 0 | 0 | 0 |
| *Mycobacterium avium* | 0 | 0 | 0 | 0 |

Table 1 shows that *Streptomyces fungicidicus* No. B–5477 produces antibiotic substances active mainly against Gram-positive bacteria.

The microbial characteristics of actinomycetes, especially of the genus Streptomyces, are not generally fixed and this applies also to the characteristics of the Enduracidin-producing strains.

Therefore, there are many mutants and variants of *Streptomyces fungicidicus* No. B–5477.

Among the mutants and variants of *Streptomyces fungicidicus*, regardless of whether the variation may be caused naturally or artificially, for example, by X-ray treatment, ultraviolet-ray treatment or by the action of chemical reagents, any one which can produce Enduracidin, can be employed.

For example, the mutant (ATCC–21014) derived from *Streptomyces fungicidicus* No. B–5477, which may be obtained by ultraviolet-ray treatment, γ-ray treatment or monospore isolation of the wild strain, can be employed.

The microbial characteristics of the mutant (IFO–12440) (ATCC–21014) of *Streptomyces fungicidicus* No. B–5477 are as follows:

A. Morphological Characteristics:
   Same as wild strain.
B. Cultural Characteristics:
   The mutant produces colorless or yellow vegetative mycelia on various cultures, and Massicot Yellow (Rdg. XVI, 21'–f) on Mustard Yellow (Rdg. XVI, 19'–b) aerial mycelia.
   The present mutant does not produce soluble pigment on most culture media, but it occasionally produces pale yellow soluble pigment.
   1. Czapek's agar:
      Vegetative mycelium (VM):
         Abundant, spreading, penetrate into the medium, pale yellow.
      Aerial mycelium (AM):
         Abundant, powdery, Cream Color (Rdg. XVI, 19'–f) to Pale Ochraceous Buff (Rdg. XV, 15'–f).
      Reverse (R):
         Cream Color.
      Soluble pigment (SP):
         None or faint yellow.
   2. Glucose Czapek's agar:
      (VM): Abundant, spreading, colorless to faint yellow.
      (AM): Moderate, powdery, white to Naples Yellow (RDG. XVI, 19'–d).
      (R): Cream Color to Mustard Yellow (RDG. XVI, 19'–b)
      (SP): None.
   3. Glycerine Czapek's agar:
      (VM): Abundant, spreading, folded, Mustard Yellow.
      (AM): Abundant, powdery, Cream Color to Naples Yellow.
      (R): Light Ochraceous Buff (Rdg. XV, 15'–d) to Achraceous-Buff (Rdg. XV, 15'–b).
      (SP): Pale Yellow.
   4. Glucose asparagine agar:
      (VM): Colorless to Mustard Yellow, spreading.
      (AM): Moderate, velvety, Massicot Yellow (Rdg. XVI, 21'–f) to Mustard Yellow.
      (R): Yellow.
      (SP): None.
   5. Bouillon agar:
      (VM): Moderate, spreading, colorless.
      (AM): Moderate, powdery, white.
      (R): Colorless.
      (SP): None.
   6. Glucose bouillon agar:
      (VM): Abundant, spreading, colorless, wrinkled.
      (AM): Moderate, powdery, white to Cream Color.
      (R): Pale brown.
      (SP): None.
   7. Glycerine bouillon agar:
      (VM): Abundant, spreading, colorless, wrinkled.
      (AM): Moderate, powdery, white.
      (R): Pale brown.
      (SP): None.
   8. Starch agar:
      (VM): Abundant, spreading, Mustard Yellow, penetrated into the medium.
      (AM): Abundant, powdery, Pale Ochraceous Buff (RDG. XV, 15'–f) to Cream Color.
      (R): Naples Yellow to Light Achraceous-Salmon (RDG. XV, 13'–d).
      (SP): None or faint yellow.
   9. Whole egg medium:
      (VM): Moderate, spreading, Naples Yellow.
      (AM): None or very scant, white to Cream Color. Color of medium does not change.
   10. Loffler's medium:
      (VM): Abundant, colorless, wrinkled.
      (AM): None.
      (SP): None, Strong liquefaction.
   11. Yeast extract agar:
      (VM): Abundant, spreading, wrinkled, colorless to faint brown.
      (AM): Abundant, powdery, Cream Color to Naples Yellow.
      (R): Antimony Yellow (Rdg. XV, 17'–b) to Light Ochraceous-Salmon.
      (SP): : None.
   12. Potato plug:
      (VM): Abundant, spreading, wrinkled, Antimony Yellow (Rdg. XV, 17'–b).
      (AM): Abundant, powdery white to LIght Ochraceous-Buff. The color of the medium becomes brown.
   13. Carrot plug:

(VM): Abundant, wrinkled, Ochraceous-Buff.
(AM): At first white, later Pale Ochraceous-Buff to Light Ochraceous-Salmon. The color of the medium does not change.

14. Bouillon:
   (VM): Scant, sinks to the bottom and abundant growth floating on the surface of the medium, colorless to Pale brown.
   (AM): Moderate, powdery, white.
   (SP): None.

15. Glucose bouillon, Glycerin bouillon: Same as on bouillon, but growth is more abundant and wrinkled.

16. Litmus milk:
   (VM): Abundant growth, Mustard Yellow, floating on the surface of the medium and ring-form growth, wrinkled.
   (AM): Scant, white, peptonization strong without coagulation.

17. Nutrient gelatin:
   (VM): Abundant, ring form on the edge of the tube, wrinkled, Ochraceous-Buff.
   (AM): Moderate, white to Cream Color. No soluble pigment. Strong liquefaction.

18. Czapek's solution with 0.2% $NaNO_3$:
   (VM): Moderate, floating on the surface of the medium, colorless.
   (AM): Moderate, powdery, white.
   (SP): None. Nitrate reduction weekly.

19. Cellulose:
   (VM): Moderately, colorless to Cream Color, spreading.
   (AM): Moderate, powdery, white to Pale Ochraceous-Salmon.

20. Calcium malate agar:
   (VM): Moderate, colorless to cream color to Ochraceous-Buff spreading.
   (AM): Moderate, powdery, white to Pale Ochraceous-Salmon.
   (R): cream color to Light Ochraceous-Salmon.
   (SP): None.

21. Tyrosine agar:
   (VM): Scant, thin, colorless.
   (AM): None.
   (R): Colorless.
   (SP): None.

22. Peptone agar:
   (VM): Moderate, spreading, colorless.
   (AM): Moderate, powdery, white to Pale Ochraceous-Buff (Rdg. XV, 15'–f).
   (R): Colorless to Cream Color.
   (SP): None. Non-chromogenic type.

23. Starch hydrolysis: Enzymatic zone/Growth zone = $22^{mm}/11^{mm}$ to $26^{mm}/13^{mm}$ C. Utilization of Carbon Sources Observed by Pridham and Gottlieb Method:

| | | | |
|---|---|---|---|
| Erythritol | ± | D-Maltose | +++ |
| Adonitol | ± | Sucrose | ± |
| D-Sorbitol | ± | Lactose | +++ |
| i-Inositol | +++ | Raffinose | ± |
| D-Mannitol | +++ | Salicin | +++ |
| Dulcitol | ± | Aesculin | + |
| D-Xylose | +++ | Inulin | ± |
| L-Arabinose | +++ | Sodium-acetate | ++ |
| L-Sorbose | + | Sodium-succinate | ++ |
| D-Galactose | +++ | Sodium-citrate | ++ |
| D-Glucose | ++ | Starch | +++ |
| D-Mannose | +++ | Rhamnose | +++ |
| Glycerine | +++ | Melibiose | + |
| D-Fructose | +++ | | |

Control ±
Remarks:
± faint growth
+ growth
++ moderate growth
+++ abundant growth The Enduracidin producing strain belonging to the genus Streptomyces is incubated in a medium containing assimilable carbon sources, digestible nitrogen sources and other necessary nutrients.

As the carbon sources, for example, starch, glucose, lactose, maltose, galactose, sucrose, dextrin, glycerol or starch syrup can be employed. As the nitrogen sources, for example, pentose, soybean powder, corn-steep liquor, meat extract, ammonium salt, organic or inorganic nitrogen compounds can be employed. Further, a small quantity of inorganic salts such as chloride, phosphate, salts of metals such as calcium, zinc, manganese, iron may be added to the medium. And, if necessary, conventional nutrient factors or an anti-foaming agent such as animal oil, wax, vegetable oil or mineral oil may be added.

For the culture of an Enduracidin-producing strain, submerged culture of shaking culture utilizing liquid medium is preferably. But, as occasion demands, static culture may be employed. The culture conditions such as temperature, culture period and pH of the medium are determined so that the production of Enduracidin is maximum. When submerged culture is employed, the production of Enduracidin becomes maximum generally under such conditions as at 25° C to 45° C, at around neutral pH and for about 3 to 10 days.

Enduracidin thus produced is contained mostly in the mycelia, but also in the liquid part of the culture broth.

Enduracidin thus accumulated in the culture broth is recovered and refined in a desired purity by utilizing appropriate means with adequate consideration being given to the properties of Enduracidin, for example, those using difference between Enduracidin and the impurities in solubility, in distribution coefficient between two liquid phases, in adsorbability, or in ion-coherence.

As the Enduracidin exists not only in the mycelia but also in the liquid part of the culture broth, it is preferable for recovering Enduracidin to separate at first mycelia from the culture broth and then to subject the mycelia and the liquid part of the culture broth, respectively, to a separation or purification process.

Practically, the separation or purification of Enduracidin is advantageously achieved by means of extraction with an organic solvent, and the best result is given when the extraction is carried out with n-butanol under basic conditions, followed by re-extracting with an aqueous acid solution.

The separation or purification of Enduracidin can be effected by taking advantage of such characteristics as that it is adsorbable on activate charcoal under alkaline conditions (pH or not lower than about 8.0), that it is extractable with an organic solvent (e.g. acidified aqueous acetone, aqueous methanol) and that it is not adsorbable on cation or anion exchange resins (e.g. Amberlite IR–120, an Amberlite IR–45).

An advantageous example of the method for extracting Enduracidin can generally be carried out as follows:

The mycelia obtained from the culture broth are washed with water, followed by subjecting the mycelia to extraction twice under neutral or acid conditions with an organic solvent (e.g. 50 to 70% aqueous acetone in a large excess relative to the mycelia, 50 to 70% methanol, etc.) at room temperature (20° to 35° C) for about 3 hours.

Thus-obtained filtrate contains a large amount of Enduracidin showing strong antimicrobial activity against Gram-positive bacteria. After adjusting to pH 5 to 6, the filtrate is concentrated in vacuo to distil out acetone followed by adjustment with sulfuric acid to pH 3, and then ethyl acetate added in an amount of ⅓ part by volume relative to the resultant mixture, and the whole mixture is shaken to transfer the soluble part into the ethyl acetate layer. Aqueous layer (containing some precipitate) separated from the ethyl acetate layer is adjusted to pH 8 with sodium hydroxide, sodium carbonate or sodium bicarbonate, followed by extracting with ⅓ volume of n-butanol relative to the whole volume.

After the above-mentioned estraction with n-butanol is repeated several times, the n-butanol layer is washed with ½ volume of water relative to the whole volume, and then extracted with aqueous acid solution (e.g. pH 2, N/200 HCl or N/200 $H_2SO_4$) to obtain an aqueous acid solution containing the active ingredient.

The aqueous solution is subjected to the above-mentioned extraction with n-butanol. Thus-obtained n-butanol layer contains a high concentration of the Enduracidin produced in the mycelia. The extraction with aqueous hydrochloric acid solution and that with n-butanol are further repeated to obtain an n-butanol layer containing the active ingredient in much higher concentration. Thus-prepared n-butanol is concentrated, washed with water and further concentrated in vacuo at a low temperature.

To the concentrated n-butanol is added ether in an amount one-tenth as much in volume as the n-butanol to yield yellowish-brown precipitates which are collected by filtration. The precipitates are washed with ether to obtain crude active ingredient containing the greater part of the Enduracidin accumulated.

The crude substance shows antimicrobial activity of 5,000 to 10,000 units per milligram against *Staphylococcus aureus* and of 5,000 to 10,000 units per milligram against *Bacillus subtilis*.

In order to refine the crude substance, the following process is advantageous.

The crude substance dissolved in an aqueous acid solution is passed through a column packed with activated charcoal, which is previously treated with an acid, followed by being treated with weakly basic ion-exchange resin (e.g. Amberlite IR—4b, IR—45, etc.) to remove the acid. Thus treated solution is concentrated or freeze-dried (lyophilized) to obtain pure active ingredient.

Thus-obtained active ingredient is further subjected to purification or is changed into its hydrochloride by, for example, the following process. Namely, the active ingredient dissolved in a methanolic hydrochloric acid solution is passed through a column packed with activated charcoal, which is previously treated with an acid, and thus-treated solution is concentrated at room temperature. Acetone-ether is added to the concentrate, followed by allowing the concentrate to yield colorless crystalline powder of Enduracidin hydrochloride.

This powder is soluble in water and methanol, and shows antimicrobial activity of 10,000 to 15,000 units per milligram against *Staphylococcus aureus* and of 10,000 to 15,000 units per milligram against *Bacillus subtilis*.

A 20 to 50% aqueous methanol solution of this powder is passed through a weakly basic ion-exchange resin, and to the effluent is added n-butanol, followed by distilling off water and methanol to give a concentrate.

Alternatively the aqueous solution of this powder is adjusted to pH to 8.5, and then the thus-treated solution is extracted with n-butanol, followed by concentration to give a concentrate.

To the thus-obtained concentrate is added ether to yield Enduracidin in its free form.

Details of physico-chemical properties of Enduracidin free base are as follows:

1. Elementary analysis:
   Enduracidin consists of C, H, N, O and Cl atoms; its gravimetric analysis being as follows:

| | C% | H% | N% | Cl% |
|---|---|---|---|---|
| Free form* | 53.2 ± 0.5 | 6.54 ± 0.3 | 14.45 ± 0.5 | 3.36 ± 0.5 |

*Note. — The free form contains 3.36 ± 0.5% of Cl, apparently due to strong ionic bonding or covalent bonding.

2. Specific rotation:
$[\alpha]_D^{23} = +85° \pm 10°$ ($c$=0.5, in dimethylformamide)

3. Absorption spectra:

| | 95% MeOH | |
|---|---|---|
| $\lambda$ max | 230 m$\mu$ | ($E_{1cm} = 220 \pm 15$) |
| | 263 m$\mu$ | ($E_{1cm} = 150 \pm 10$) |
| | N/10 HCl | |
| $\lambda$ max | 230 m$\mu$ | ($E_{1cm} = 195 \pm 10$) |
| | 272 m$\mu$ | ($E_{1cm} = 112 \pm 10$) |
| | N/10 NaOH | |
| $\lambda$ max | 250 m$\mu$ | ($E_{1cm} = 335 \pm 10$) |

The significant infrared absorption bands in microns (KBr-method):

| | |
|---|---|
| 3.05 (strong) | 6.90 (middle) |
| 3.25 (shoulder) | 7.23 (middle) |
| 3.38 (shoulder) | 7.63 (middle) |
| 5.75 (shoulder) | 8.10 (broad, strong) |
| 5.95 (shoulder) | 8.51 (middle) |
| 6.09 (strong) | 9.90 (middle) |
| 6.24 (shoulder) | 10.40 (weak) |
| 6.47 (shoulder) | 11.92 (middle) |
| 6.55 (shoulder) | 12.30 (weak) |
| 6.61 (strong) | 12.75 (very weak) |

4. Color:
Colorless powder

5. Color reaction:

| reagent | result |
|---|---|
| Ninhydrin reagent | Positive (pale-brownish violet) |
| Barton's reagent (a mixture of equal volume of 1% aqueous ferric chloride and 1% aqueous potassium ferricyanide) | positive (pale-blue) |
| Alkaline potassium permanganate | discoloration occurs (reduction) |

6. Melting point:
205° to 225°C (sintering) 225° to 240°C (decomposition)

7. Solubility:
Enduracidin is readily soluble in pyridine, dimethylformamide, dilute hydrochloric acid, aqueous alkaline solution (with decomposition), soluble in aqueous methanol, aqueous ethanol, aqueous acetone and aqueous butanol, but insoluble or hardly soluble in water, absolute ethanol, pure butanol, pure acetone.

8. Rf value (paper partition chromatography):
(Measured by using ascending method on "Whatman filter paper No. 1" (W. and R. Balston Ltd., Great Britain).

| Solvent | $R_f$ value* |
|---|---|
| Acetic acid/n-Butanol/Water (1:4:5) | 0.45 ± 1 |
| n-Butanol saturated with water | 0.0 |
| Pyridine/n-Butanol/Water (3:4:7) | 0.80 ± 0.1 |

* The substance is easily adsorbed on filter paper under neutral conditions.

Enduracidin may be used in the pure state or in a crude state such as culture broth, especially culture medium of an Enduracidin-producing microorganism, e.g.
*Streptomyces fungicidicus* No. 5477, or extracts thereof.

It is now possible by the use of Enduracidin according to the present invention to obtain unexpected results in raising meat-producing livestock, the results being greater than achieved by the use of an antibiotic such as aureomycin.

These unexpected results include an increased rate of weight gain, a high extent of weight gain and a high feed efficiency in feed conversion, for example.

The foregoing results are directly connected with improved raising of meat-producing livestock such as chick, layer, broiler, sow, pig, calf, duck and turkey.

The effective amount of Enduracidin for accelerating gain of body weight varies with the size, kind and growth stage of the livestock, but falls usually within the range from about 0.1 to about 10 milligram(s), preferably 0.5 to 5 milligrams, per kilogram of body weight per day.

In order to practice the method for accelerating gain of body weight of livestock according to this invention, it is practically convenient to have an effective amount of Enduracidin dispersed in the feedstuff or drinking water for the livestock.

As to the feed composition, the effective amount of enduracidin for livestock is about 2 to 400 milligrams, preferably about 5 to 50 milligrams, of Enduracidin per kilogram of feedstuff.

Suitable concentration of Enduracidin to be dispersed in drinking water for livestock is about 4 to 1000 milligrams, preferably 30 to 150 milligrams, per liter of the water.

When Enduracidin is added to feedstuff or drinking water, it is preferable to take the form of additives concentrate.

By selecting a proper diluent and by altering the ratio of edible carrier to Enduracidin, a feed composition of any desired concentration can be prepared.

Formulations containing Enduracidin at a ratio of about 1 to 40% by weight, preferably about 2 to 25% by weight, are particularly convenient for use as additives to livestock feedstuff.

Moreover, Enduracidin is intimately dispersed or admixed through a livestock feedstuff or an edible carrier therefor by means of, for example, grinding, stirring, milling or tumbling.

It is to be noted, however, that the suitable concentration or suitable dose of Enduracidin is to be determined in accordance with the kinds of livestock, age, body weight, and average amount of feed consumed daily, and the determination can be made by one of ordinary skill in the art in per se conventional manner.

In addition, the drinking water or feedstuff for the livestock can also contain antibiotics such as aureomycin, Mikamycin, Oleandomycin, Penicillin, Tetracyclin, amino acids such as glutamic acid, aspartic acid, leucine, lysine, tryptophane, valine, serine, proline, glucine, alanine, isoleucine, phenylalanine, argine, methionine, threonine, or their salts, vitamins such as Vitamin $B_1$, Vitamin $B_2$, Vitamin $B_6$, Vitamin $B_{12}$, Vitamin C, Vitamin D, biotin, folic acid, Vitamin K, Vitamin E, Vitamin P, inositol, orotic acid, α-lipoic acid, etc.

The medium lethal dose ($LD_{50}$) of Enduracidin against acute toxicity in mice is not less than 880 milligrams per kilogram of body weight when administered intraperitoneally and not less than 66 milligrams per kilogram of body weight when administered intravenously.

The medium lethal dose ($LD_{50}$) of Enduracidin against acute toxicity in rats is not less than 300 milligrams per kilogram of body weight when administered intraveneously.

For the purpose of giving those skilled in the art a better understanding of the invention, the following comparative tests and examples are given.

Test 1

400 broiler chickens (Goto–Hiiku No. 3) 3 days old, each weighing about 60 grams, were divided into four groups (females 50, males 50 in each group).

Two groups, referred to as the test groups, were fed 22.2 milligrams of Enduracidin per kilogram of feedstuff.

The other two groups, referred to as the control groups, were fed 22.2 milligrams of aureomycin per kilogram of feedstuff.

Each group was raised by so-called floor feeding and ad libitum feeding.

From the start of the test up to age 30 days, the feedstuff of the composition detailed in Example 1 (broiler starter) was fed to all groups, and thereafter the feedstuff as shown in Example 1 (broiler finisher) was fed to them.

The result is as in Table 1.

TABLE 1

| Groups | 10 days-old | | 20 days-old | | 30 days-old | | 40 days-old | | 50 days-old | | 60 days-old | |
|---|---|---|---|---|---|---|---|---|---|---|---|---|
| | Control | Test | Control | Test | Control | Test | Control | Test | Control | Test | Control | Test |
| Rate of raising (percent) | 100 | 100 | 100 | 100 | 100 | 100 | 99.0 | 100 | 99.0 | 100 | 99.0 | 99.0 |
| Body weight (g.) | 146 | 161 | 354 | 375 | 635 | 649 | 926 | 942 | 1,140 | 1,205 | 1,522 | 1,613 |
| Coefficient of growth (percent) [1] | 100 | 110.3 | 100 | 105.9 | 100 | 102.2 | 100 | 101.7 | 100 | 105.7 | 100 | 105.9 |
| Feed conversion ratio [2] | 2.13 | 2.12 | 1.95 | 1.80 | 2.01 | 1.96 | 2.39 | 2.29 | 2.62 | 2.42 | 2.70 | 2.52 |

[1] The ratio of increase in body weight to that of control.
[2] The ratio of weight in kilogram of feedstuff required to gain one kilogram of body weight.

From the above Table 1, it is deemed that the test group showed a 5 to 11% and about 0.15 increase in comparison with the control group on body weight and feed conversion ratio, respectively, at the stages of 10 and 20 days old.

Furthermore, the test group showed an about 5% and 0.18 increase in comparison with the control group on the average body weight and feed conversion ratio, respectively, at the stage of 60 days old.

Test 2

400 broiler chickens (Goto–Hiiku No. 3) of 3 days old, each weighing about 60 grams, were divided into four groups (females 50; males 50 in each group).

Two groups, referred to as the test groups, were fed 15 milligrams of Enduracidin per kilogram of the feedstuff of the same composition as used in Test 1.

The other two groups, referred to as the control groups, were fed 15 milligrams of aureomycin per kilogram of the feedstuff of the same composition as above.

Each group was raised by so-called floor feeding and ad libitum feeding.

The result is as in Table 2.

TABLE 2

| Groups | 10 days-old | | 20 days-old | | 30 days-old | | 40 days-old | | 50 days-old | | 60 days-old | |
|---|---|---|---|---|---|---|---|---|---|---|---|---|
| | Control | Test | Control | Test | Control | Test | Control | Test | Control | Test | Control | Test |
| Rate of raising (percent) | 100 | 100 | 100 | 100 | 100 | 100 | 100 | 100 | 99 | 100 | 99 | 100 |
| Body weight (g.) | 145 | 158 | 364 | 386 | 604 | 616 | 928 | 951 | 1,163 | 1,218 | 1,512 | 1,585 |
| Coefficient of growth (percent) [1] | 100 | 108.9 | 100 | 106.0 | 100 | 102.0 | 100 | 102.5 | 100 | 104.7 | 100 | 104.8 |
| Feed conversion ratio [2] | 1.76 | 1.66 | 1.92 | 1.83 | 2.21 | 2.16 | 2.48 | 2.41 | 2.72 | 2.60 | 2.89 | 2.74 |

[1] [2] The same as Test 1.

From the above Table 2, the test group showed a 6 to 9% and about 0.1 increase in comparison with the control group on the body weight and feed conversion ratio, respectively, at the stages of 10 and 20 days old.

Furthermore, the test group showed about 4.8% and 0.15 increase in comparison with the control group on the average body weight and feed conversion ratio, respectively, at the stage of 60 days old.

EXAMPLE 1

| Broiler Ingredient | Starter (weight %) | Finisher (weight %) |
|---|---|---|
| Corn | 54.85 | 56.65 |
| Soybean oil meal (45%) | 16.00 | 14.00 |
| Wheat meal | 5.00 | 5.00 |
| Fish meal (60%) | 10.00 | 8.00 |
| Fish solubles | 3.00 | 3.00 |
| Alfalfa meal | 3.00 | 3.00 |
| Tallow (30%) | 6.00 | 8.00 |
| Calcium phosphate and calcium carbonate (50:50 by weight) | 1.60 | 1.60 |
| Table salt | 0.25 | 0.40 |
| Lipophilic vitamin premix (containing A, D and E) | 0.05 | 0.05 |
| Vitamin B premix (containing $B_1$, $B_2$, $B_6$ and $B_{12}$) | 0.15 | 0.15 |
| Mineral premix (commercially available) | — | 0.05 |
| 2.2% Enduracidin premix (dispersed in lactose) | 0.10 | 0.10 |
| Total | 100.00 | 100.00 |

EXAMPLE 2

| Chick Ingredients | starter; (grams) | Pre-starter; (grams) |
|---|---|---|
| Corn | 600 | 1000 |
| Soybean oil meal (44%) | 560 | 600 |
| Wheat | 600 | |
| Alfalfa meal | 60 | 20 |
| Fish meal (60%) | 50 | 100 |
| Dried whey | 50 | 50 |
| Meat and bone scraps (50%) | | 50 |
| Condensed fish solubles | | 60 |
| Distiller's dried solubles | | 50 |
| Calcium phosphate | 30 | 20 |
| Ground oyster shell or limestone | 30 | 30 |
| Salt | 10 | 10 |
| Manganese sulphate | 0.5 | 0.5 |
| Feed Flavor | 0.5 | 1 |
| 10% Enduracidin premix (dispersed in lactose) | 0.2 | 0.5 |

EXAMPLE 3

| Broiler starter Ingredients | gram(s) |
|---|---|
| Corn | 1050 |
| Soybean oil meal (50%) | 625 |
| Alfalfa meal | 50 |
| Poultry by-product meal | 50 |
| Dried whey | 50 |
| Fat | 90 |
| Calcium phosphate | 30 |
| Ground oyster shell or limestone | 35 |
| Manganese sulphate | 0.5 |
| Feed Flavor | 0.5 |
| 10% Enduracidin (dispersed in lactose) | 0.2 |

EXAMPLE 4

| Broiler finisher Ingredients | gram(s) |
|---|---|
| Corn | 700 |
| Wheat | 600 |
| Soybean oil meal (50%) | 320 |
| Poultry by-product meal | 100 |
| Distiller's dried solubles | 50 |
| Condensed fish solubles | 50 |

| | |
|---|---|
| Alfalfa meal | 60 |
| Fat | 50 |
| Calcium phosphate | 30 |
| Ground oyster or limestone | 30 |
| Salt | 10 |
| Manganese sulphate | 0.5 |
| Feed Flavor | 0.5 |
| 10% Enduracidin (dispersed in lactose) | 0.2 |

EXAMPLE 5

Pig milk replacer

| Ingredients | starter; (grams) | Pre-starter; (grams) |
|---|---|---|
| Corn meal | 30 | 10 |
| Wheat meal | 28 | 23 |
| Soybean powder (treated at 120°C) | 25 | 20 |
| Fish meal | 8 | 5 |
| Molasses | 4.5 | — |
| 10%, Enduracidin premix (dispersed in lactose) | 0.05 | 0.05 |
| NaCl | 0.3 | 0.3 |
| Precipitated calcium carbonate | 0.4 | 0.45 |
| Calcium secondary phosphate | 0.6 | 0.7 |
| 2.2% Aureomycin premix (dispersed in soybean cake) | 0.2 | 0.3 |
| Pepsin | 0.1 | 0.1 |
| Spice for pig | 0.05 | 0.05 |
| Vitamin B$_{12}$ (2.2%) | 0.05 | 0.1 |
| Sodium cyclohexylsulphamate | 0.09 | 0.1 |
| Non-fat milk powder | — | 25 |
| Sugar | — | 7 |

EXAMPLE 6

Pig pre-starter

| In Ingredients | gram(s) |
|---|---|
| Ground yellow corn | 435 |
| Sucrose | 200 |
| Dried skimmed milk | 600 |
| Fish meal (60%) | 100 |
| Soybean oil meal (44%) | 400 |
| Dried whey | 100 |
| Condensed fish solubles | 40 |
| Fat | 80 |
| Calcium phosphate | 15 |
| Ground oyster shell or limestone | 10 |
| Salt, iodized | 10 |
| Manganese sulphate | 0.25 |
| 10% Enduracidin premix (dispersed in lactose) | 0.5 |
| Sodium glutamate | 1 |

EXAMPLE 7

Sow Feed

| Ingredients | gram(s) |
|---|---|
| Corn | 1340 |
| Wheat middlings | 300 |
| Soybean oil meal (44%) | 200 |
| Tankage | 60 |
| Alfalfa meal | 60 |
| Calcium phosphate | 10 |
| Ground oyster shell or limestone | 20 |
| Salt | 10 |
| Manganese sulphate | 0.25 |
| 10% Enduracidin premix (dispersed in lactose) | 0.65 |

EXAMPLE 8

Calf starter

| Ingredients | gram(s) |
|---|---|
| Corn | 560 |
| Wheat middlings | 400 |
| Soybean oil meal (44%) | 400 |
| Linseed meal | 300 |
| Distiller's dried solubles | 50 |
| Alfalfa meal | 100 |
| Condensed fish solubles | 50 |
| Molasses | 100 |
| Ground oyster shell or limestone | 30 |
| Salt | 10 |
| Manganese sulphate | 0.25 |
| Sodium glutamate | 0.5 |
| 10% Enduracidin premix (dispersed in lactose) | 0.3 |

EXAMPLE 9

Duck Grower

| Ingredients | grams(s) |
|---|---|
| Corn | 500 |
| Wheat | 764 |
| Soybean oil meal (44%) | 60 |
| Alfalfa meal | 50 |
| Wheat middling | 200 |
| Fish meal (60%) | 50 |
| Meat and bone scraps (50%) | 100 |
| Oats, pulverized | 10 |
| Delactosed whey | 10 |
| Ground oyster shell or limestone | 40 |
| Salt | 5.5 |
| Manganese sulphate | 0.5 |
| 10% Enduracidin premix (dispersed in lactose) | 0.5 |
| Sodium glutamate | 2 |

What is claimed is:

1. A method for accelerating gain of body weight of livestock, which comprises feeding to the livestock about 0.1 to about 10 milligrams of Enduracidin per kilogram of body weight per day, the physical and chemical properties of the Enduracidin being as follows:

1. Elementary analysis (%):
   C: 53.2 ± 0.5
   H: 6.54 ± 0.3
   N: 14.45 ± 0.5
   Cl: 3.36 ± 0.5

2. Specific rotation:
   $[\alpha]_D^{23} = +85° \pm 10°$ ($c=0.5$, in dimethylformamide)

3. Absorption spectra:

95% MeOH
   $\lambda$ max
   $\begin{cases} 230\ m\mu\ (E_{1cm}^{1\%} = 220 \pm 15) \\ 263\ m\mu\ (E_{1cm}^{1\%} = 150 \pm 10) \end{cases}$ N/10 HCl
   $\lambda$ max
   $\begin{cases} 230\ m\mu\ (E_{1cm}^{1\%} = 195 \pm 10) \\ 272\ m\mu\ (E_{1cm}^{1\%} = 112 \pm 10) \end{cases}$ N/10 NaOH
   $\lambda$ max
   $250\ m\mu\ (E_{1cm}^{1\%} = 335 \pm 10)$ Significant infrared absorption bands in microns (KBr method):

| | |
|---|---|
| 3.05 (strong) | 6.90 (middle) |
| 32.5 (shoulder) | 7.23 (middle) |
| 3.38 (shoulder) | 7.63 (middle) |
| 5.75 (shoulder) | 8.10 (broad, strong) |
| 5.95 (shoulder) | 8.51 (middle) |
| 6.09 (strong) | 9.90 (middle) |
| 6.24 (shoulder) | 10.40 weak) |
| 6.47 (shoulder) | 11.92 (middle) |
| 6.55 (shoulder) | 12.30 (weak) |
| 6.61 (strong) | 12.75 (very weak) |

4. Color:
   Colorless powder

5. Color reaction:

| Reagent | Result |
|---|---|
| Ninhydrin reagent | Positive (pale-brownish violet) |
| Barton's reagent | positive (pale-blue) |
| Alkaline potassium permanganate | discoloration (reduction) |

6. Melting point:
   205° to 225° C. (sintering); 225° to 240° C (decomposition)
7. Solubility:
   Readily soluble in pyridine, dimethylformamide, dilute hydrochloric acid, aqueous alkaline solution (with decomposition), soluble in aqueous methanol, aqueous ethanol, aqueous acetone and aqueous butanol, insoluble or hardly soluble in water, absolute ethanol, pure butanol and pure acetone.
8. R$f$ value (paper partition chromatography):

| Solvent | R$f$ value |
| --- | --- |
| Acetic acid/n-Butanol/Water (1:4:5) | 0.45 ± 1 |
| n-Butanol saturated with water | 0.0 |
| Pyridine/n-Butanol/Water (3:4:7) | 0.80 ± 0.1 |

2. The method according to claim 11, wherein the Enduracidin is in the form of a nutritionally acceptable acid addition salt.

3. The method according to claim 2, wherein the acid addition salt is hydrochloride.

4. A feed composition for enhancing gain of body weight of livestock, which comprises livestock feedstuff having dispersed therein about 5 to 50 milligrams of Enduracidin, defined as in claim 11 per kilogram of the feedstuff.

5. The feed composition according to claim 4, wherein the Enduracidin is in the form of a nutritionally acceptable acid addition salt.

6. The feed composition according to claim 5, wherein the acid addition salt is hydrochloride.

7. A composition for accelerating gain of body weight of livestock, which comprises, as an effective ingredient, about 1 to about 40 percent by weight of Enduracidin, defined as in claim 11, in admixture with an edible carrier.

8. The composition according to claim 7, wherein the Enduracidin is in the form of a nutritionally acceptable acid addition salt.

9. The composition according to claim 8, wherein the acid addition salt is hydrochloride.

* * * * *